United States Patent Office 3,416,589
Patented Dec. 17, 1968

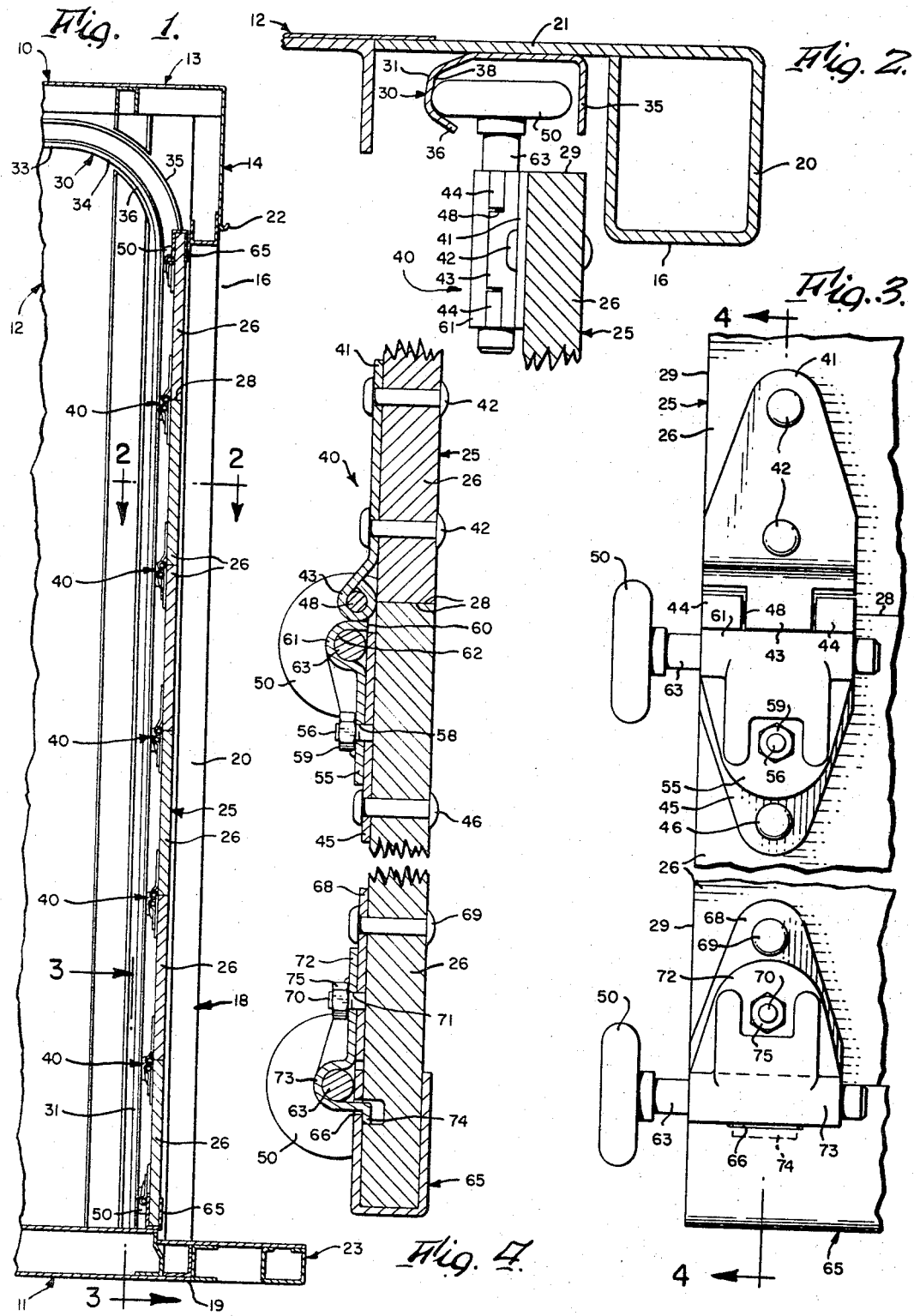

3,416,589
CARGO TRUCK REAR DOOR
Glen H. Lambein, Batavia, N.Y., assignor to T. Whiting Manufacturing, Inc., Akron, N.Y., a corporation of New York
Filed Apr. 21, 1967, Ser. No. 632,733
9 Claims. (Cl. 160—201)

ABSTRACT OF THE DISCLOSURE

A truck door roller plate is secured by a single bolt and nut on one of two hinge leaves and is provided with a C-shaped tubular roller shaft carrying end portion having a free edge facing and in contact with the adjacent face of the one hinge leaf, such end portion also extending along and in contact with the knuckles of the two leaves for stability of the plate, the purpose of this structure being to facilitate removal of the door and repair of the hinge leaves simply by removal of the roller plate.

---

Rear doors for cargo trucks commonly comprise a series of hinged panels having their end edges arranged to travel along tracks at the sides of the doorway and extending along the roof, and in some instances the pintles of the hinges provide shafts for rollers which ride along the tracks to support and guide the panels in opening and closing the door. Such roller mountings have a number of serious disadvantages: (a) installation of the door required four men to lift the door and thread it onto the upper end of the track; (b) removal of the door for repairs was equally difficult; (c) repair of individual rollers or panels, at a minimum required hinge removal and replacement, and a usual procedure for such repairs was to remove the entire door as with (b) above, and (d) with the tracks built into the side walls to provide wider door openings, the previously enumerated disadvantages were intensified.

Summary of the invention

Such difficulties are obviated with the present invention by removably attaching a plate preferably by a single bolt and nut to one leaf of each end hinge, which plate is formed to provide at one end portion an open ended channel or tube which extends along and adjacent to and preferably in contact with the hinge knuckles and holds the shaft for the support roller, which roller can then be easily removed by merely detaching the plate. This tube preferably is C-shaped in cross section and has a free edge facing and adjacent, and preferably in contact with the outer face of the hinge leaf on which the plate is mounted, the preferred contact between the tube and the hinge knuckles and between the free edge and the hinge leaf providing stability for the roller carrying plate.

In the accompanying drawings, FIG. 1 is a fragmentary vertical longitudinal section through the rear end of a truck body having a rear door mounted in accordance with the present invention. FIG. 2 is an enlarged fragmentary horizontal section taken on line 2—2, FIG. 1. FIG. 3 is an enlarged fragmentary vertical section taken on line 3—3, FIG. 1. FIG. 4 is a fragmentary vertical section taken generally on line 4—4, FIG. 3.

The numeral 10 represents the closed body of a truck having the usual floor structure 11, side walls 12 and roof structure 13, the rear end of which roof structure is shown as extended downwardly, as indicated at 14, to provide the upper limit of the rear doorway 16 of the truck body. This doorway is enclosed by a door frame 18 having a sill structure 19 forming a continuation of the floor structure 11 of the body, tubular jambs 20 having forwardly projecting flanges 21 secured to and forming a continuation of the side walls 12 of the body and a lintel 22 at the lower end of the downward extension 14 of the roof structure 13. The cargo is loaded into the truck body 10 through this doorway 16 and to facilitate cargo movement a shelf-like rearward extension 23 of the sill 19 can be provided.

In transit the doorway 16 is closed by a vertically movable door 25, which is shown as made of six rectangular panels 26 hinged together along their horizontal side edges 28 which are arranged in edge-to-edge relation to one another. The vertical end edges 29 of the several panels are arranged to travel in closely spaced relation to parallel tracks 30 which are severally arranged at each side of the truck and each track includes a vertical part 31 fixed to the truck body alongside the doorway 16, preferably to the flange 21 of the tubular jamb 20 of the door frame as shown in FIG. 2; a horizontal top part 33 secured to the body under the roof structure 13 to extend along the inside of the corresponding side wall 12; and a curved part 34 connecting each vertical part 31 with its horizontal top part 33. Each track 30 as best shown in FIG. 2 is of channel shape in cross section, with one flange 35 straight and with its other flange 36 of C-shaped form in cross section to form a concave channel 38 facing the straight flange 35. This C-shaped flange 36 forms the bottom of the horizontal top part 33 of the track and the inside flange of the curved and vertical parts 34 and 31 thereof.

The panels 26 are successively connected together by any suitable number of hinges, but the present invention relates to those hinges 40 which are arranged near the vertical end edges 29 of the panels and in closely spaced relation to the tracks 30. Each of these hinges has a leaf 41 fixed, as by rivets 42, to one of the panels 26 and as having a conventional knuckle 43, the axis of which is in line with the companion pair of horizontal side edges 28 of the panels which the hinge connects. The knuckle 43 is coaxial and mates with a pair of knuckles 44 of a companion hinge leaf 45 which is fixed, as by a rivet 46, to the adjacent panel 26. A pintle 48 is contained in and pivotally connects the knuckles 43, 44.

The present invention is embodied in means removably mounting the door supporting rollers 50 severally on these hinges and which rollers ride in the concave parts 38 of the flanges 36 at opposite sides of the body 10. To this end a plate 55 is removably fixed to the outer face of hinge leaf 45, as by a stud bolt 56 fixed to and projecting outwardly from this hinge leaf 45 through an aperture 58 in the plate 55, but not extending into door panel 26. A nut 59 is provided at the end of each stud bolt 58 to press its plate 55 toward the hinge leaf 45. For stability, one end portion of this plate 55 is formed to provide a tube or channel 61 which is arranged to extend along, parallel and adjacent or in closely spaced relation to, and preferably in contact with, the knuckles 43, 44, and tube 61 is provided with a free edge 60 facing and adjacent, and preferably in contact with, the outer face of leaf 45. Preferably this tube or channel is in the form of a C-shaped channel with its concave side 62 facing the hinge leaf 45 so that one part of the tube is formed by the outer face of the hinge leaf 45.

Each tube or channel 61 extends lengthwise and parallel with the knuckles 43 and 44 and houses the pin 63 of a companion door supporting and guiding roller 50, this pin being preferably pressed against the hinge leaf 45 by the plate 55 and its nut 59 and the roller being rotatably mounted on its pin 63.

In addition, rollers 50 are provided at the bottom side corners of the door 25 and are preferably mounted as follows:

The bottom edge of the bottom panel 26 and the top edge of the top panel 26 of the door are armored by a U-shaped sheet metal wear channel 65. At its opposite ends the inside flange of each U-shaped channel 65 is provided with horizontal slots 66. A first plate 68 is secured to the bottom and top panels 26, as by a rivet 69, in vertical alinement with each of these slots 66 and carries a stud bolt 70 which projects through an opening 71 in a plate 72. This plate 72 is formed to provide a horizontal tube or channel 73, one wall of this tube 73 preferably being provided by the inside flange of the corresponding channel 65 for the door. At its corresponding tubular end portion the plate 72 is provided with a tongue 74 which extends through and locks behind the slot 66 in its U-shaped bottom channel 65. As with each plate 55, each of the plates 72 is secured by a nut 75 and carries the shaft 63 of a roller 50 in its tube or channel portion 73, each of these rollers 50 riding in the concavity 38 of the C-shaped flange 36 of the companion track 30.

In operation, the rollers 50 ride along the concavities 38 of the C-shaped flanges 36 of the side tracks 30 so that upon lifting the door 25 its several panels 26 travel around the curved portions 34 of the tracks 30 onto the top portions 33 of these tracks and thereby leave the opening 16 free for loading or unloading the truck body 10. The door is closed by pulling down the outermost panel 26 until its U-shaped bottom channel 65 engages the sill 19, the rollers 50 again guiding the several panels 26 to travel along the tracks 30.

By virtue of the fact that the axes of the pins 63, which carries the door supporting and guide rollers 50 are close to and parallel with the pintles 48 of the end hinges 40, this tracking of the several panels 26 along the tracks 30 is accomplished smoothly and without any binding or frictional disturbance of the several panels 26 of the door 25.

This simple mounting for each roller provides a number of important and unexpected advantages. First, obviously, the repair or replacement of the roller at any hinge merely requires removal of its nut 59 and plate 55, this also applying to the end corner rollers 50. Heretofore, at a minimum such repair would require the removal of a hinge in situ, and it was not uncommon practice to remove the entire door by withdrawing the door from the forward open ends of the roof track sections 33. Such door removal required four men. With the present invention, even to remove a complete door for any purpose, all that is necessary is to remove the several nuts 59 (and the four nuts 75 for the corner rollers 50) and the entire door is free for removal. Conversely, in original door installation it was usual to thread the door in these open ends of the roof track sections 33, again requiring four men. With the present invention the door, complete except for rollers, can be stood up in the door opening and the rollers 50 bolted on. Possibly more important than the above, to achieve wider door openings, it is now possible to build the track 30 into the walls of the truck body where removal or installation of the door through the open ends of the roof track sections 33 would be impossible. Instead, as indicated above, even with a track built into the side walls of the truck, the door, without rollers, can be stood up between the vertical sections 31 of the track 30, and the rollers 50 positioned and bolted on, and removal of the door effected by a simple reverse procedure.

I claim:

1. In a cargo carrying vehicle having a body 10 with floor 11, side walls 12 and a roof 13 defining with said side walls 12 and floor 11 a doorway 16, a pair of parallel tracks 30 severally arranged at each side of said body 10 and each track 30 including a vertical part 31 arranged alongside said doorway 16, a horizontal top part 33 under said roof 13 and extending along the corresponding side wall 12 and a curved part 34 connecting each vertical part 31 with its horizontal top part 33, a door 25 formed of a plurality of panels 26 having horizontal side edges 28 arranged in edge-to-edge relation to one another and end edges 29 arranged to travel in closely spaced relation to said tracks 30, and hinges 40 connecting said horizontal side edges 28 of said panels 26, certain of said hinges 40 being arranged adjacent said tracks 30 and each comprising a leaf 41 fixed to one of said panels 26 and having a knuckle 43 coaxial with the knuckle 44 of a companion leaf 45 fixed to the adjacent panel 26 and a horizontal pintle 48 in and pivotally connecting said knuckles 44, 45 wherein the improvement comprises a plate 55, means 56, 59 removably fixing said plate 55 to the face of one 45 of said leaves, said plate having one end portion formed to provide a tube 61 arranged adjacent to said face of said one 45 of said leaves and extending along and adjacent to said knuckles 43, 44, a shaft 63 housed in said tube 61, and a roller 50 on said shaft 63 and riding along the adjacent track 30 to constrain said panels 26 to follow said track 30 in opening and closing the door 25 formed thereby, said roller 50 being readily removed by unfastening its said plate 55 from its hinge leaf 45.

2. The combination set forth in claim 1 wherein said tube 61 is in part formed by said face of said one 45 of said leaves.

3. The combination set forth in claim 2 wherein the part of said tube 61 formed by said end portion of said plate 55 is C-shaped in cross section and serves to compress said shaft 63 laterally against said one 45 of said leaves, said tube part contacting said knuckles 43, 44 and having a free edge 60 facing and in contact with said face of said one 45 of said leaves.

4. The combination set forth in claim 1 wherein said means 56, 59 removably fixing said plate 55 to said one 45 of said leaves comprises a stud bolt 56 fixed to said one 45 of said leaves and projecting outwardly through an aperture 58 in said plate 55, and a nut 59 on the outer end of said stud bolt 56.

5. The combination set forth in claim 4 wherein said tube 61 is in part formed by said face of said one 45 of said leaves.

6. The combination set forth in claim 5 wherein the part of said tube 61 formed by said end portion of said plate 55 is C-shaped in cross section and serves to compress said shaft laterally against said one 45 of said leaves, said tube part contacting said knuckles 43, 44 and having a free edge 60 facing and in contact with said face of said one 45 of said leaves.

7. The combination set forth in claim 1 wherein said means 56, 59 removably fixing said plate to said one 45 of said leaves consist solely of a stud bolt 56 fixed to said one 45 of said leaves and projecting outwardly through an aperture 58 in said plate 55 but terminating short of said door panel 26, and a nut 59 on the other end of said bolt 56.

8. The combination set forth in claim 7 wherein said tube 61 is in part formed by said face of said one 45 of said leaves.

9. The combination set forth in claim 8 wherein the part of said tube 61 formed by said end portion of said plate 55 is C-shaped in cross section and serves to compress said shaft laterally against said one 45 of said leaves, said tube part contacting said knuckles 43, 44 and having a free edge 60 facing and in contact with said face of said one 45 of said leaves.

References Cited
UNITED STATES PATENTS

| | | | |
|---|---|---|---|
| 1,974,147 | 9/1934 | Bittorf | 16—104 |
| 2,090,099 | 8/1937 | Bittorf et al. | 160—209 X |
| 2,090,146 | 8/1937 | Pixley | 160—209 X |
| 2,567,763 | 9/1951 | Clark | 16—97 |
| 2,837,151 | 6/1958 | Stroup | 160—201 X |

FOREIGN PATENTS 1,146,884  11/1957  France.

DAVID J. WILLIAMOWSKY, *Primary Examiner.*
DENNIS L. TAYLOR, *Assistant Examiner.*

U.S. Cl. X.R.
16—137